(12) United States Patent
Yin et al.

(10) Patent No.: US 10,348,886 B2
(45) Date of Patent: Jul. 9, 2019

(54) ANSWERING INCOMING CALL ON DUAL-SCREEN MOBILE DEVICE

(71) Applicants: Hisense Mobile Communications Technology Co., Ltd., Qingdao, Shandong (CN); Hisense USA Corp., Suwanee, GA (US); Hisense International Co., Ltd., Qingdao, Shandong (CN)

(72) Inventors: Yanyan Yin, Shandong (CN); Haiying Wang, Shandong (CN)

(73) Assignees: Hisense Mobile Communications Technology Co., Ltd., Qingdao, Shandong (CN); HISENSE USA CORP., Suwanee, GA (US); Hisense International Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/935,486

(22) Filed: Mar. 26, 2018

(65) Prior Publication Data
US 2018/0288220 A1 Oct. 4, 2018

(30) Foreign Application Priority Data

Mar. 29, 2017 (CN) .......................... 2017 1 0198285
May 18, 2017 (CN) .......................... 2017 1 0351977

(51) Int. Cl.
*H04M 1/725* (2006.01)
*H04M 1/02* (2006.01)
*H04M 1/03* (2006.01)

(52) U.S. Cl.
CPC ..... *H04M 1/72597* (2013.01); *H04M 1/0266* (2013.01); *H04M 1/03* (2013.01); *H04M 1/72519* (2013.01); *H04M 1/72583* (2013.01); *H04M 2201/08* (2013.01); *H04M 2250/16* (2013.01); *H04M 2250/22* (2013.01)

(58) Field of Classification Search
CPC ...................... H04M 1/72597; H04M 2201/08
See application file for complete search history.

(56) References Cited

U.S. PATENT DOCUMENTS 8,588,860 B2 * 11/2013 Sirpal .................. G06F 1/1616
455/566
2017/0083272 A1 * 3/2017 Sun ....................... G06F 3/1423

* cited by examiner

*Primary Examiner* — Tuan H Nguyen
(74) *Attorney, Agent, or Firm* — Brinks Gilson & Lione

(57) ABSTRACT

A method of answering an incoming call on a dual-screen mobile device comprising a main body, and two screens and two sound openings which are respectively located on two opposite surfaces of the main body is provided. The method includes: upon receiving an incoming call, an incoming call operation option is displayed on a first screen of the dual-screen mobile, an answer option is determined based on an answer operation which is performed by a user in response to the incoming call operation option, where the answer option includes answering on a second screen opposite to the first screen, and a sound of the incoming call is output from the sound opening on the surface where the second screen is located in response to that the answer option indicates answering on the second screen.

14 Claims, 5 Drawing Sheets

US 10,348,886 B2

ANSWERING INCOMING CALL ON DUAL-SCREEN MOBILE DEVICE

CROSS REFERENCE TO RELATED APPLICATIONS

This application claims priority to Chinese Patent Application No. 201710198285.8, filed on Mar. 29, 2017, and Chinese Patent Application No. 201710351977.1, filed on May 18, 2017, the entire contents of all of which are incorporated by reference herein.

TECHNICAL FIELD

The present disclosure relates to technical features related to the process of answering an incoming call on a dual-screen mobile device.

BACKGROUND

With the rapid development of mobile devices, there are more and more diverse design styles of mobile devices. One of the design styles of mobile devices is a dual-screen mobile device. One of the two display screens in the dual-screen mobile device may be a color display screen, such as, a liquid crystal display screen or an organic light-emitting diode display screen; and the other one of the two display screens in the dual-screen mobile device may be an E-ink screen. Different display screens may be used in different applications. For example, the E-ink screen may be used for such functions as reading.

SUMMARY

In view of the above, the present disclosure provides a method of answering an incoming call on a dual-screen mobile device and a dual-screen mobile device.

In a first exemplary embodiment, a method of answering an incoming call on a dual-screen mobile device including a main body, and two screens and two sound openings which are respectively located on two opposite surfaces of the main body is provided. The method includes: an incoming call operation option is displayed on a first screen of the dual-screen mobile device upon receiving an incoming call; an answer option is determined based on an answer operation which is performed by a user in response to the incoming call operation option, where the answer option includes answering on a second screen opposite to the first screen; and in response to that the answer option indicates answering on the second screen, a sound of the incoming call is output from the sound opening on the surface where the second screen is located.

In a second exemplary embodiment, a dual-screen mobile device is provided. The dual-screen mobile device includes a processor and a non-volatile machine readable storage medium. By reading and invoking machine-executable instructions corresponding to a control logic for answering an incoming call on the dual-screen mobile device stored on the non-volatile machine readable storage medium, the processor is caused to perform the method of answering an incoming call on the dual-screen mobile device provided by the first aspect.

BRIEF DESCRIPTION OF DRAWINGS

To more clearly illustrate the technical solutions in examples of the present disclosure, the accompanying drawings to describe the examples will be briefly described below. Apparently, the drawings in the following descriptions are merely some examples contained in the present disclosure, and other drawings may also be obtained by those of ordinary skill in the art according to these drawings without any creative work.

DETAILED DESCRIPTION

To illustrate more clearly the objectives, technical solutions and advantages of the present disclosure, examples of the present disclosure will be described in more details below in combination with accompanying drawings.

Each of front and back surfaces of the dual-screen mobile device provided by the present disclosure is provided with a screen and a speaker. In this way, both the front and back surfaces enable the functions of display, touch operation and answering an incoming call. In an example, each of the front and back surfaces is provided with a liquid crystal display screen or an Organic Light Emitting Display (OLED) screen. In another example, the front surface is provided with a liquid crystal display screen or an OLED screen, and the back surface is provided with an ink screen. For convenience of description, the display screen on the front surface is referred to as a first screen and the display screen on the back surface is referred to as a second screen herein.

Figure 1:
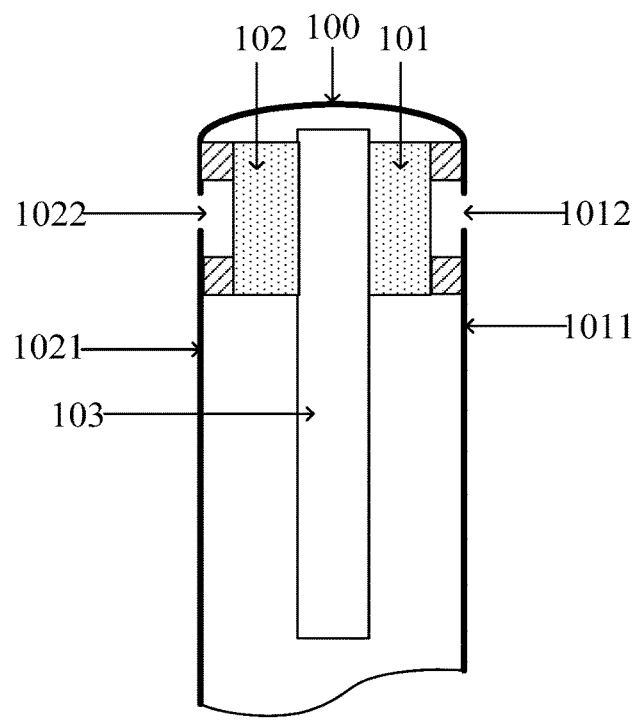
FIG. 1 shows a schematic diagram illustrating a structure of a dual-screen mobile device according to an example of the present disclosure.

FIG. 1 shows a schematic diagram illustrating a structure of a dual-screen mobile device according to an example of the present disclosure. Referring to FIG. 1, the dual-screen mobile device includes a main body 100, a display screen 1011 (hereinafter referred to as a first screen) provided on a front surface of the main body 100 and a display screen 1021 (hereinafter referred to as a second screen) provided on back surface of the main body 100. The front surface is opposite to the back surface. A sound opening 1012 is provided on the front surface, and a sound opening 1022 is provided on the back surface. Referring to FIG. 1, two headphones 101 and 102 are symmetrically disposed in the main body 100 of the dual-screen mobile device with respect to a mainboard 103 of the dual-screen mobile device. In other words, the two headphones 101, 102 are disposed on two sides of the mainboard 103, respectively. A sound exit surface of the headphone 101 faces the sound opening 1012 and is in communication with the sound opening 1012. A sound exit surface of the headphone 102 faces the sound opening 1022 and is in communication with the sound opening 1022.

Figure 2:
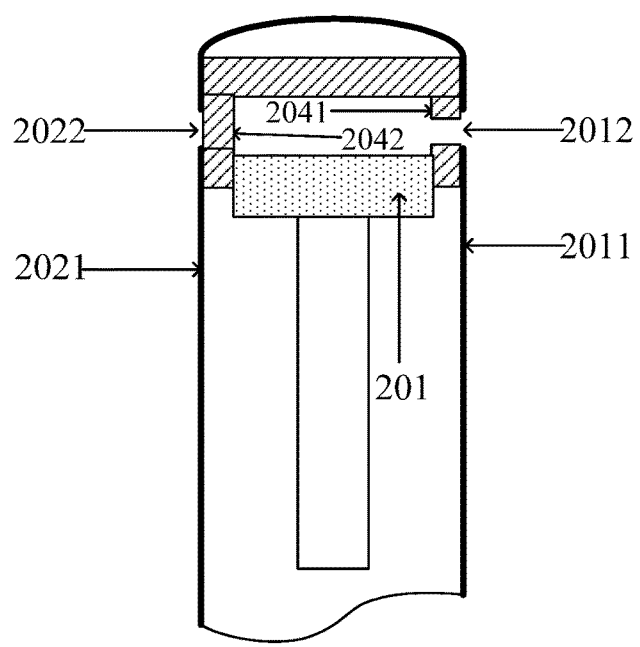
FIG. 2 shows a schematic diagram illustrating a structure of a dual-screen mobile device according to another example of the present disclosure.

FIG. 2 shows a schematic diagram illustrating a structure of a dual-screen mobile device according to another example of the present disclosure. Referring to FIG. 2, the dual-screen mobile device is provided with only one headphone 201, an electromagnetic valve 2041 is provided on an inner side of a front surface and faced to a sound opening 2012, and an electromagnetic valve 2042 is provided on an inner side of a back surface and faced to a sound opening 2022. The front surface is opposite to the back surface. A first screen 2011 is provided on the front surface. A second screen 2021 is provided on the back surface. The electromagnetic valve 2041 is configured to control opening and/or closing of a first sound transmission passage between the sound opening 2012 and a sound exit surface of the headphone 201. The electromagnetic valve 2042 is configured to control opening and/or closing of a second sound transmission passage between the sound opening 2022 and the sound exit surface of the headphone 201. For example, in FIG. 2, the sound exit surface of the headphone 201 is perpendicular to a display plane of any one of the first screen 2011 and the second screen 2021. The electromagnetic valve 2041 is disposed on the inner side of the front surface and faced to the sound opening 2012. When the electromagnetic valve 2041 is closed, the first sound transmission passage between the sound exit surface of the headphone 201 and the sound opening 2012 is closed. When the electromagnetic valve 2041 is opened, the first sound transmission passage between the sound exit surface of the headphone 201 and the sound opening 2012 is opened. Correspondingly, the electromagnetic valve 2042 is disposed on the inner side of the back surface and faced to the sound opening 2022. When the electromagnetic valve 2042 is closed, the second sound transmission passage between the sound exit surface of the headphone 201 and the sound opening 2022 is closed. When the electromagnetic valve 2042 is opened, the second sound transmission passage between the sound exit surface of the headphone 201 and the sound opening 2022 is opened.

Figure 3:
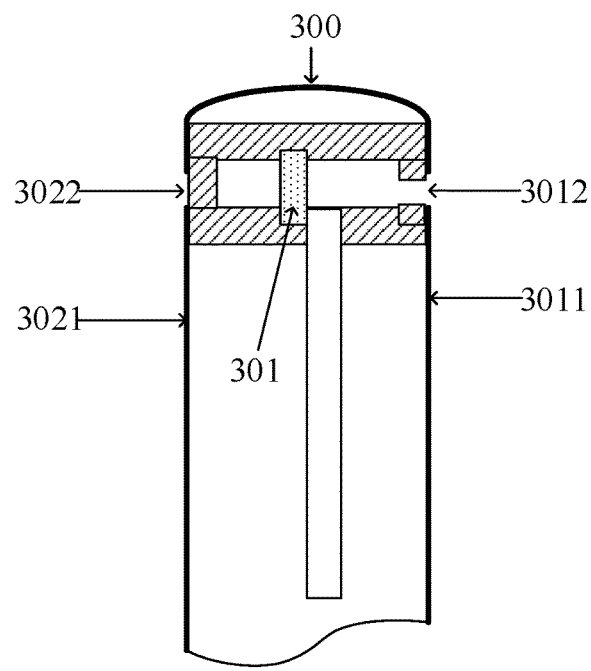
FIG. 3 shows a schematic diagram illustrating a structure of a dual-screen mobile device according to yet another example of the present disclosure.

FIG. 3 shows a schematic diagram illustrating a structure of a dual-screen mobile device according to yet another example of the present disclosure. As shown in FIG. 3, the dual-screen mobile device is provided with only one headphone 301. The headphone 301 includes two opposite sound exit surfaces that are parallel to a display plane of any one of the display screens 3011, 3021, and respectively correspond to the sound openings 3012, 3022 on the front surface and the back surface. In addition, both upper and lower ends of the headphone 301 are fixed on two support structures in a main body 300 of the dual-screen mobile device, respectively.

Figure 4:
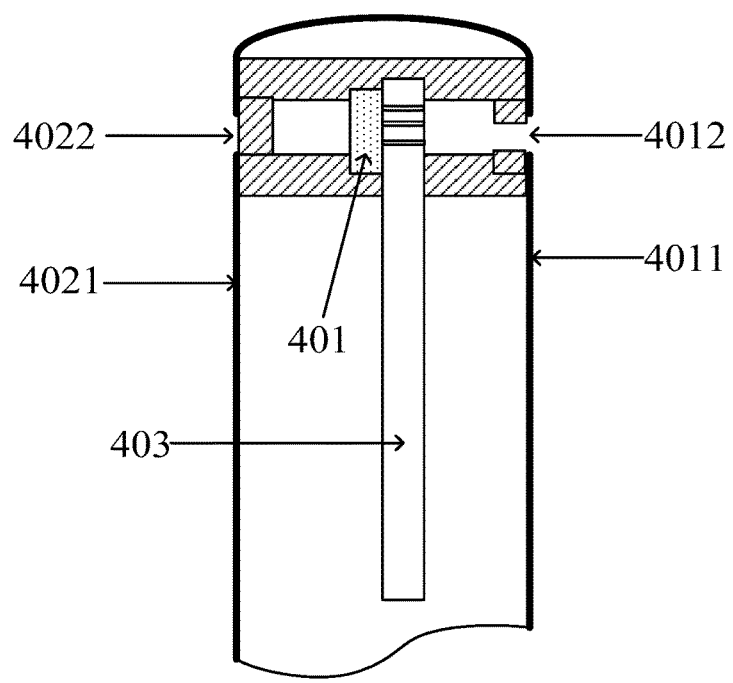
FIG. 4 shows a schematic diagram illustrating a structure of a dual-screen mobile device according to still another example of the present disclosure.

FIG. 4 shows a schematic diagram illustrating a structure of a dual-screen mobile device according to still another example of the present disclosure. As shown in FIG. 4, the dual-screen mobile device is provided with only one headphone 401 which is similar to the headphone 301 in FIG. 3. Further, the headphone 401 is also directly fixed at a side of a mainboard 403 and close to a display screen (such as, the second screen 4021). A region at which the mainboard 403 is in contact with the headphone 401 is of a hollowed-out structure. In this way, sound sent from a first sound exit surface, which is parallel to the second screen 4021, of the headphone 401 is transmitted out via the sound opening 4022, and sound sent from a second sound exit surface, which is parallel to the first screen 4011, of the headphone 401 is transmitted out via the hollowed-out structure and the sound opening 4012.

Figure 5:
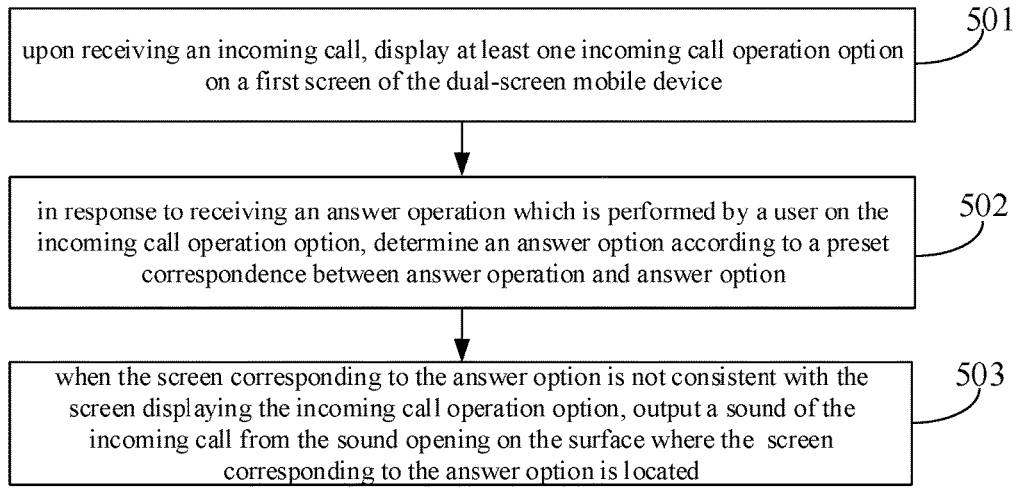
FIG. 5 shows a flowchart illustrating a method of answering an incoming call on a dual-screen mobile device according to an example of the present disclosure.

FIG. 5 shows a flowchart illustrating a method of answering an incoming call according to an example of the present disclosure. The method is applied to any one of the dual-screen mobile devices shown in FIGS. 1-4. Referring to FIG. 5, the method includes the following steps.

At step 501, upon receiving an incoming call, the dual-screen mobile device displays at least one incoming call operation option on a first screen of the dual-screen mobile device, where the dual-screen mobile device includes a main body, and two screens and two sound openings which are respectively located on two opposite surfaces of the main body.

The incoming call operation option may include a touch operation, such as a slide operation, a single-click operation, a double-click operation or the like. In an example, the dual-screen mobile device further displays prompt information in the incoming call operation option. The prompt information is used to prompt a user of the dual-screen mobile device on how to perform the incoming call operation option.

In an example, step 501 further includes determining a screen to display the incoming call operation option according to a pre-determined incoming call display rule. The preset incoming call display rule includes at least one of the followings: displaying the incoming call operation option on a currently-awakened screen of the two screens; displaying the incoming call operation option on a screen facing up currently of the two screens; displaying the incoming call operation option on a last-awakened screen of the two screens; displaying the incoming call operation option on both of the two screens; displaying the incoming call operation option on a preset first screen of the two screens, and the like. The screen facing up currently of the two screens is a display screen on a side of the dual-screen mobile device which is currently away from the ground.

Figure 6:
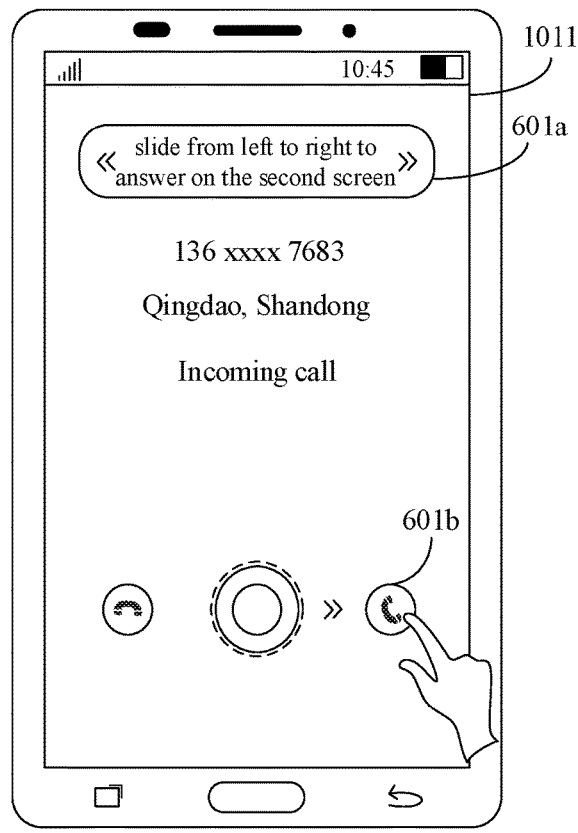
FIG. 6 shows a schematic diagram illustrating a display interface of an incoming call operation option according to an example of the present disclosure.

FIG. 6 shows a schematic diagram illustrating a display interface of an incoming call operation option according to an example of the present disclosure. It is assumed that the pre-determined incoming call display rule is to display the incoming call operation option on the currently-awakened screen of the two screens. In an example, when the dual-screen mobile device shown in FIG. 1 monitors an incoming call and detects that the currently-awakened screen is the first screen 1011, the dual-screen mobile device will play an incoming call ringtone by the speaker and display the incoming call operation option 601a on the first screen 1011. As shown in FIG. 6, the incoming call operation option 601a is an icon which can receives a touch operation, and prompt information "slide from left to right to answer on the second screen" is displayed in the icon. The prompt information is used to prompt the user to perform a slide operation on a display region of the incoming call operation option 601a, such as, the icon. In this way, it triggers the incoming call to be answered so that the call sound played by the headphone 102 (as shown in FIG. 1) is output via the sound opening 1022 (as shown in FIG. 1), and the user can answer the incoming call via the second screen 1021.

At step 502, in response to receiving an answer operation which is performed by a user on the incoming call operation option, the dual-screen mobile device determines an answer option according to a preset correspondence between answer operation and answer option.

In an example, the user performs the answer operation, such as a touch operation, on the screen which is displaying the incoming call operation option, and thus it triggers the answer option for the incoming call operation option. The touch operation, such as a slide operation or a double-click operation is preconfigured in the dual-screen mobile device. The answer option includes answering on the first screen or answering on the second screen.

In addition, a correspondence between answer operation and answer option is pre-stored in dual-screen mobile devices. Thus, the user can perform a touch operation on the screen which is displaying the incoming call operation option. When the touch operation performed by the user on the displayed incoming call operation option is monitored, the mobile device further determines the answer option corresponding to the touch operation according to the correspondence.

In an example, the correspondence between the answer operation on the incoming call operation option and the answer option includes: when a slide operation on the incoming call operation option is monitored, a corresponding answer option indicates answering the incoming call on the screen which is opposite to the screen which is displaying the operation option for incoming call. In another example, the correspondence between the answer operation on the incoming call operation option and the answer option includes: when a single-click operation on the incoming call operation option is monitored, the corresponding answer option indicates answering the incoming call on the screen which is now displaying the incoming call operation option. In still another example, the correspondence between the answer operation on the incoming call operation option and answer option includes: when a touch operation on the incoming call operation option which is displaying on the first screen is monitored, the corresponding answer option indicates answering the incoming call on the second screen which is opposite to first screen. In yet another example, the correspondence between the answer operation on the incoming call operation option and answer option includes: when a touch operation on the incoming call operation option which is displaying on the second screen is monitored, the corresponding answer option indicates answering the incoming call on the first screen.

In an example, it is assumed that the incoming call operation option is displayed on the first screen of the dual-screen mobile device, the correspondence between the answer operation on the incoming call operation option and the answer option is pre-configured in the dual-screen mobile device, the answer option corresponding to a slide operation is to answer the incoming call on the second screen, and the answer option corresponding to a single-click operation on an answer icon is to answer the incoming call on the first screen. In this way, in the display interface shown in FIG. 6, in an example, when the user performs a slide operation in the region where the incoming call operation option 601a is being displayed on the first screen 1011, the dual-screen mobile device determines that the answer option is to answer on the second screen according to the slide operation; and in another example, when the user performs a single-click operation in the region where the answer icon 601b is being displayed on the first screen 1011, the dual-screen mobile device determines that the answer option is to answer on the first screen according to the single-click operation.

At step 503, when the screen corresponding to the answer option is not consistent with the screen displaying the incoming call operation option, the dual-screen mobile device outputs a sound of the incoming call from the sound opening on the surface where the screen corresponding to the answer option is located.

When a touch operation for an incoming call operation option displayed on one of two display screens of the device has been received, the dual-screen mobile device answers the call according to an answer option corresponding to the touch operation. For example, the dual-screen mobile device detects whether the screen corresponding to the answer option is the same as the screen that is displaying the incoming call operation option first. If yes, the dual-screen mobile device directly outputs the sound of the incoming call from the sound opening on the surface where the screen that is currently displaying the incoming call operation option is located. If no, it means the screen corresponding to the answer option is not the same as the screen which is now displaying the incoming call operation option, and the dual-screen mobile device awakens the screen corresponding to the answer option and outputs the sound of the incoming call from the sound opening on the surface where the screen corresponding to the answer option is located.

In an example, descriptions will be made in conjunction with the dual-screen mobile device shown in FIG. 1 and the incoming call operation option shown in FIG. 6. Assuming that the screen that is currently displaying the incoming call operation option is the first screen 1011. When the user performs a slide operation in the region where the incoming call operation option 601a is being displayed on the first screen 1011, the dual-screen mobile device determines that the corresponding answer option is to answer the incoming call on the second screen according to the slide operation. In this case, the dual-screen mobile device awakens the second screen 1021 corresponding to the answer option and display the incoming call operation option on the second screen 1021. The user performs an answer operation on the second screen 1021, and thus the incoming call can be answered and the sound of the incoming call is being output from the sound opening 1022 on the surface where the second screen 1021 is located.

In another example, when the screen corresponding to the answer option is not consistent with the screen displaying the incoming call operation option, the sound of the incoming call is directly switched to the headphone on the surface where the screen corresponding to the answer option is located, without awakening the screen corresponding to the answer option. For example, after performing a slide operation on the first screen 1011 which is displaying the incoming call operation option, the user directly answers the incoming call by putting the second screen 1021 close to an ear, without performing any further operation on the second screen 1021.

When the user performs a single-click operation in the region where the answer icon 601b is being displayed on the first screen 1011, the dual-screen mobile device determines that the answer option corresponding to the single-click operation is to answer on the first screen 1011. In this case, the dual-screen mobile device directly answers the incoming call and the sound of the incoming call is being output from the sound opening 1012 on the surface where the first screen 1011 is located. That is, the dual-screen mobile device allows the incoming call to be directly answered via the sound opening 1012 on the surface where the first screen 1011 is located after detecting that the user performs the single-click operation on the first screen 1011.

In other examples, when a touch operation for an incoming call operation option displayed on one of two display screens of the device has been received, the dual-screen mobile device awakens the screen corresponding to the answer option and displays associated information of the incoming call and a set of available call functions on the awakened screen.

The associated information includes one or more of such information as the incoming call number, a caller name, an address of the incoming call and a call duration. The call functions include one or more of recording, handsfree, contacts, call buttons and hang-up.

Figure 7:
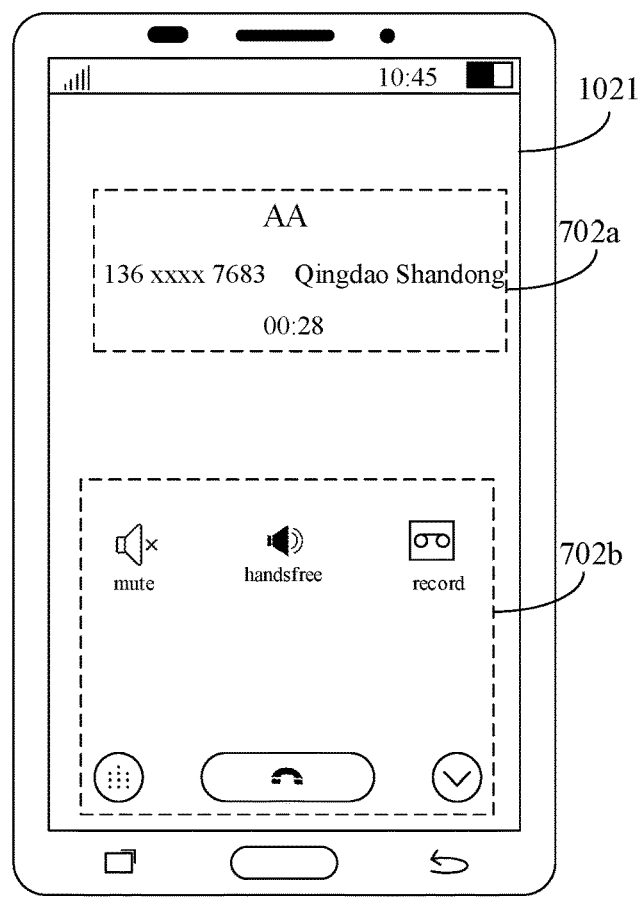
FIG. 7 shows a schematic diagram illustrating a display interface of associated information according to an example of the present disclosure.

In an example, FIG. 7 shows a schematic diagram illustrating an interface displaying associated information according to an example of the present disclosure. As shown in FIG. 7, when a slide operation on the first screen 1011 is detected, the dual-screen mobile device shown in FIG. 1 awakens the second screen 1021 and displays associated information 702*a* of the incoming call on the second screen 1021. The associated information 702*a* includes one or more of the following: a caller name: AA, an incoming call number: 136 xxxx 7683, an address of the incoming call: Qingdao Shandong, and a call duration: 28 seconds. In addition, as shown in FIG. 7, one or more of call functions 702*b* such as mute, handsfree, record, call buttons and hang-up is further displayed on the second screen 1021.

According to another example, as shown in FIG. 1, two headphones 101, 102 are provided in the dual-screen mobile device. When a touch operation has been received for an incoming call operation option displayed on the first screen 1011, the dual-screen mobile device directly activates the headphone 102. In this case, the sound of the incoming call being played by the headphone 102 is output from the sound opening 1022, thereby answering the incoming call.

Figure 8:
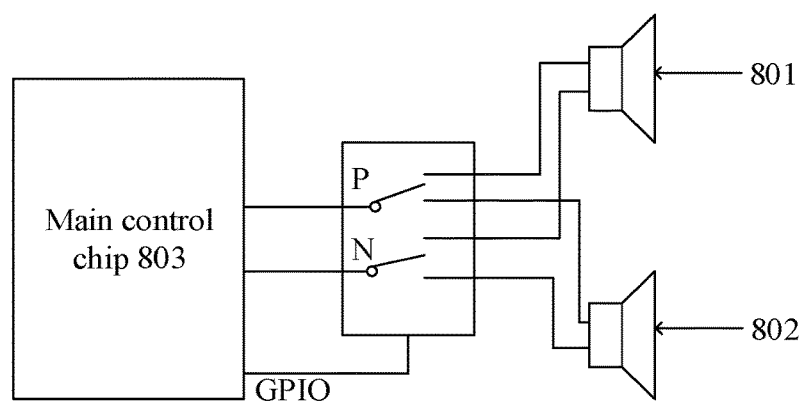
FIG. 8 shows a schematic diagram illustrating a connection structure between a headphone and a main control chip in a dual-screen mobile device according to an example of the present disclosure.

FIG. 8 shows a schematic diagram illustrating a connection structure between a headphone and a main control chip in a dual-screen mobile device according to an example of the present disclosure. As shown in FIG. 8, two headphones 801 and 802 in the dual-screen mobile device both are connected to the main control chip 803 respectively through a switch P and a switch N. The main control chip is able to control opening and closing of the two switches P and N through a General Purpose Input Output (GPIO) bus, thereby controlling the connection between the headphone 801 and the main control chip (e.g., activating the headphone 801) or controlling the connection between the headphone 802 and the main control chip (e.g., activating the headphone 802).

In an example, combined with FIG. 1, it is assumed that the dual-screen mobile device outputs the sound of an incoming call from the sound opening 1022 on the back surface. Referring to FIG. 8, the dual-screen mobile device is able to control the connection between the headphone 102 and the main control chip 803 through the GPIO bus to activate the headphone 102. In this case, the sound from the headphone 102 is output via the sound opening 1022 on the back surface, thereby answering the incoming call via the second screen 1021.

According to another example, as shown in FIG. 2, the dual-screen mobile device is provided with only one headphone 201. When the dual-screen mobile device outputs the sound of an incoming call from the sound opening 2022 on the back surface which is opposite to the front surface on which the first screen 2011 is currently displaying the incoming call operation option, it directly activates the headphone 201 and open the electromagnetic valve 2042 at the inner side of the back surface and close the electromagnetic valve 2041 at the inner side of the front surface, such that the sound from the headphone 201 is allowed to be output only via the sound opening 2022 on the back surface.

In an example, referring to FIG. 2, assuming that the dual-screen mobile device outputs the sound of an incoming call only via the sound opening 2022 on the back surface, the dual-screen mobile device activates the headphone 201 and open the electromagnetic valve 2042 and close the electromagnetic valve 2041, which allows the sound from the headphone 201 to be output only via the sound opening 2022 on the back surface. Thus, the sound from the headphone 201 is not output via the sound opening 2012 and other people cannot hear the sound via the sound opening 2012, thereby guaranteeing the privacy when the headphone 201 is playing the sound of the incoming call.

In an alternative application scenario, combined with FIG. 1, when the dual-screen mobile device is placed on a desktop, if the dual-screen mobile device monitors an incoming call, it displays an incoming call operation option on the screen currently facing up, such as the first screen 1011. By the above methods of answering an incoming call provided by examples of the present disclosure, after performing an answer operation, such as a slide operation, on the first screen 1011, it allows a user to directly pick up the dual-screen mobile device and put the second screen 1021 close to his or her ear to answer the incoming call. In this case, the sound of the incoming call is output from the sound opening 1022 on the back surface where the second screen is located. In the process of answering the incoming call, the front surface where the first screen 1011 is located is facing the palm of the user when the user is picking up the dual-screen mobile device from the desktop, and thus the user directly puts the back surface where the second screen 1021 is located close to his or her ear without turning over the dual-screen mobile device, and listen to the sound of the incoming call from the sound opening in the back surface where the second screen is located. It thus can be seen that according to the above methods of answering an incoming call provided by examples of the present disclosure, in a case that the dual-screen mobile device is put on a desk or other planes, an incoming call can be answered on the second screen by performing a touch operation on the first screen that is currently displaying an incoming call operation option, so that it is not necessary for the user to turn over the dual-screen mobile device in the process of answering the incoming call. In this way, more convenience when being used will be brought to the user and the risk of falling down due to turning over the dual-screen mobile device is reduced.

In another alternative application scenario, it is assumed that an incoming call display rule which is preset in the dual-screen mobile device is to display an incoming call operation option on the first screen. Combined with FIG. 1, if an incoming call is monitored when the user is using the second screen 1021 by holding the dual-screen mobile device, since the first screen 1011 of the dual-screen mobile device is facing the palm of the user at this time, the user answers the incoming call via the second screen 1021 by directly sliding with one finger on the first screen which is currently displaying the incoming call operation option. In the process of answering the incoming call, it is not necessary for the user to turn over the dual-screen mobile device to perform the answer operation on the first screen. In this way, the flexibility and efficiency of answering an incoming call are effectively improved.

It is noted that for a dual-screen mobile device provided with two headphones, there may be a difference in sound quality between the two headphones because the two headphones may be different in acoustic structure. Therefore, to improve the consistency of the sound from the two headphones, the dual-screen mobile device may further pre-store a correspondence between headphone identifier and audio parameters. The audio parameters include one or more of the following: gain, sensitivity, resonant frequency, effective frequency range, etc. When the screen corresponding to answer option (for example, the first screen) is not consistent with the screen which is displaying the incoming call operation option (for example, the second screen), and the sound of the incoming call is output from the sound opening on the surface where the second screen is located, the dual-screen mobile device further determines an identifier of a target headphone corresponding to the sound opening on the surface where the second screen is located, and then determine the audio parameters corresponding to the identifier of the target headphone according to the preset correspondence between headphone identifier and audio parameters, so that the parameters of the target headphone are adjusted according to the determined audio parameters to ensure that the sound heard by the user via the two headphones is consistent.

In an example, the correspondence between headphone identifier and audio parameters pre-stored in the dual-screen mobile device is as shown in Table 1. Combined with FIG. 1, when determining that the target headphone is the headphone 102, the dual-screen mobile device further determines that audio parameters corresponding to the target headphone 102 are gain A2, sensitivity B2 and resonant frequency C2 according to the correspondence shown in Table 1. Then, the dual-screen mobile device adjusts the parameters of the target headphone 102 according to the determined audio parameters. For example, the dual-screen mobile device adjusts the gain A2 of the target headphone 102 to A1, the sensitivity B2 to B1 and the resonant frequency C2 to C1.

TABLE 1

| Headphone Identifier | Audio Parameters | | |
|---|---|---|---|
| | Gain | Sensitivity | Resonant Frequency |
| 101 | A1 | B1 | C1 |
| 102 | A2 | B2 | C2 |

It is noted that for a dual-screen mobile device provided by examples of the present disclosure, it is also needed to perform acoustical sealing processing on the joint structure between headphone(s) and support structure(s) within the main body so as to avoid the sound from the headphone being reflected within the dual-screen mobile device or output via the undesired sound opening. In this way, the sound quality can be ensured. For example, the headphone is fixed with foam, dispensing, ultrasonic welding and so on. Referring to FIG. 1, it is assumed that an incoming call operation option is displayed on the first screen 1011 and a slide operation is performed for the incoming call operation option, in this case, the desired sound opening is the sound opening 1022 and the undesired sound opening is the sound opening 1012.

It is noted that the sequence of the steps of the method of answering an incoming call on a dual-screen mobile device according to an example of the present disclosure may be adjusted properly and the steps may also be increased or decreased as required. Any variation of the methods which a person skilled in the art can easily envisage should be encompassed in the scope of protection of the present disclosure, which thus will not be described redundantly.

Figure 9:
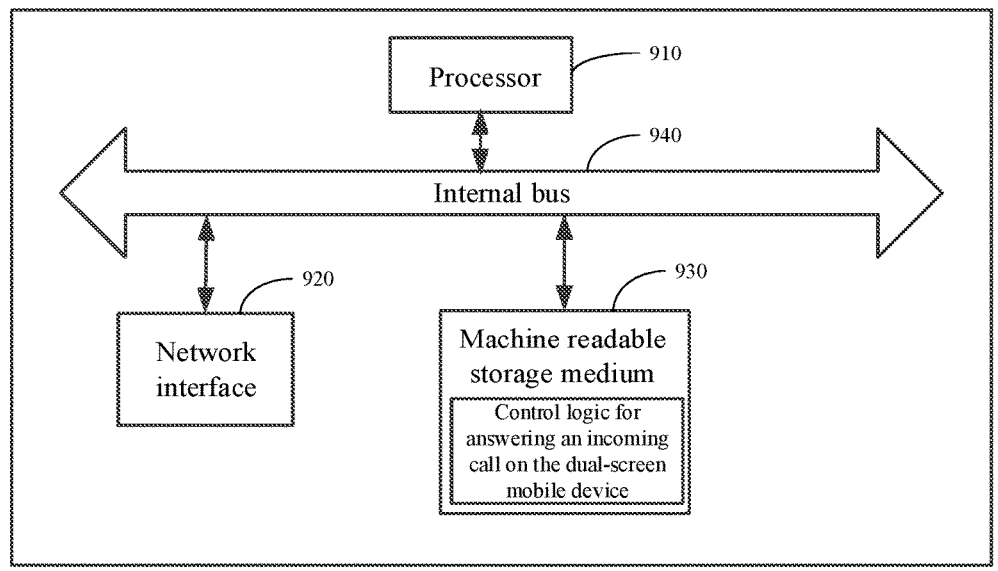
FIG. 9 shows a schematic diagram illustrating a hardware structure of a dual-screen mobile device according to an example of the present disclosure.

FIG. 9 shows a schematic diagram illustrating a hardware structure of a dual-screen mobile device according to an example of the present disclosure. In addition to a processor 910, a network interface 920, a non-volatile machine-readable storage medium 930 and an internal bus 940 shown in FIG. 9, the dual-screen mobile device may also include other hardware according to actual functions, which will not be described redundantly herein.

In different examples, the non-volatile machine-readable storage medium 930 includes a Read-Only Memory (ROM), a non-volatile memory, a flash memory, a storage drive (e.g. hard disk drive), a solid state hard disk, any type of storage disk (e.g., optical disk, Digital Video Disk (DVD)), or a similar storage medium, or a combination thereof.

Figure 10:
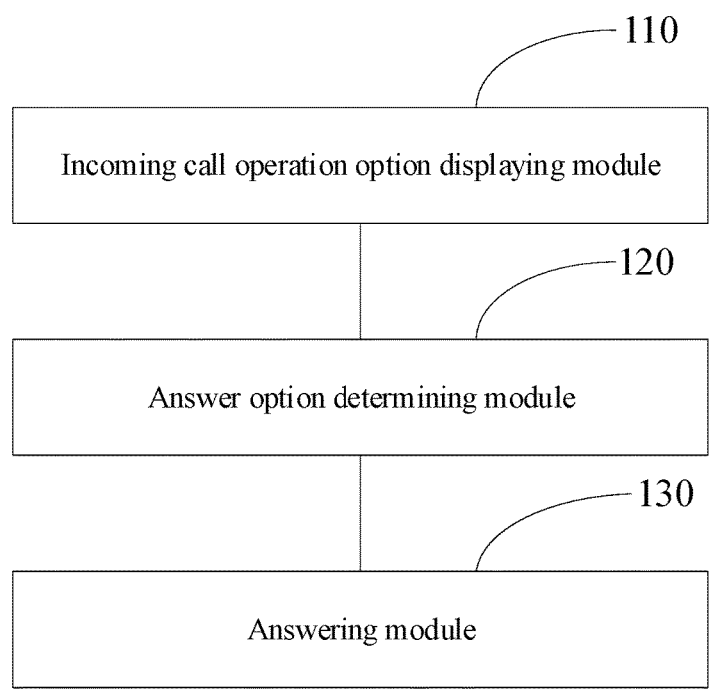
FIG. 10 shows a schematic module diagram of a control logic for answering an incoming call on a dual-screen mobile device according to an example of the present disclosure.

Further, the non-volatile machine-readable storage medium 930 stores a control logic for answering an incoming call on the dual-screen mobile device. As shown in FIG. 10, divided by functions, the control logic for answering an incoming call on the dual-screen mobile device includes an incoming call operation option displaying module 110, an answer option determining module 120 and an answering module 130.

The incoming call operation option displaying module 110 is configured to display an incoming call operation option on a first screen of the dual-screen mobile device when the incoming call is received, where the dual-screen mobile device includes a main body, and two screens and two sound openings which are respectively located on two opposite surfaces of the main body.

The answer option determining module 120 is configured to determine an answer option based on an answer operation which is performed by a user in response to the incoming call operation option, where the answer option indicates answering the incoming call on a second screen opposite to the first screen or the first screen.

The answering module 130 is configured to output a sound of the incoming call from the sound opening on the surface where the second screen is located in response to that the answer option indicates answering on the second screen.

The incoming call display rule and the correspondence between answer operation and answer option are similar to those in the method of answering an incoming call in the above dual-screen mobile devices, which will not be described redundantly herein.

When the screen corresponding to the answer option is not consistent with the screen displaying the incoming call operation call, the answering module 130 further includes an awakening sub-module and an answering sub-module. The awakening sub-module is configured to awaken the screen corresponding to the answer option. The answering sub-module is configured to output the sound of the incoming call from the sound opening on the surface where the awakened screen is located.

In an example, the awakening sub-module is further configured to display associated information of the incoming call and a set of available call functions on the awakened screen.

The control logic for answering an incoming call on the dual-screen mobile device further includes an audio parameter determining module and a processing module. The audio parameter determining module is configured to determine one or more audio parameters corresponding to a headphone identifier of the headphone for the second screen, according to a correspondence between the headphone identifier and the one or more audio parameters. The processing module is configured to adjust the headphone for the second screen according to the determined one or more audio parameters.

In an example, the control logic for answering an incoming call on the dual-screen mobile device in the present disclosure is considered as machine-executable instructions stored on the non-volatile machine-readable storage medium 930. When the processor 910 of the dual-screen mobile device in the present disclosure executes the control logic, the processor implements the above method of answering an incoming call on a dual-screen mobile device by invoking machine-executable instructions corresponding to the control logic that are stored on the non-volatile machine-readable storage medium 930.

According to an example of the present disclosure, there is also provided a non-volatile machine-readable storage medium including machine-executable instructions, for example, the non-volatile machine-readable storage medium 930 in FIG. 9. The machine-executable instructions are executed by the processor 910 of the dual-screen mobile device so as to implement the above-described method of answering an incoming call on a dual-screen mobile device.

It will be clearly understood by those skilled in the art that for the convenience and simplicity of description, the structure of the dual-screen mobile device and the specific working steps of different modules described above may be seen from the corresponding implementation steps of the method described above, which will not be redundantly described herein. The modules described herein may be understood to include at least the software, hardware, and/or circuitry for implementing the attributed features.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of examples of the disclosure but not intended to limit the disclosure, and any modifications, equivalent substitutions, variations thereof made without departing from the spirit and scope of the disclosure shall be encompassed in the scope of protection of the present disclosure.

What is claimed is:

1. A method of answering an incoming call on a dual-screen mobile device, the method comprising:
   upon receiving an incoming call, displaying an incoming call operation option on a first screen of two screens included on the dual-screen mobile device, wherein the first screen is located on a first surface of a main body that is opposite a second surface, wherein the main body comprises:
      a first headphone having a first sound exit surface in communication with one of a first sound opening on the first surface where the first screen is located or a second sound opening; and
      a second headphone having a second sound exit surface in communication with the other one of the first sound opening or the second sound opening not in communication with the first headphone;
   determining an answer operation performed by a user in response to the incoming call operation option;
   determining an answer option based on the answer operation, wherein the answer option includes implementing an answering operation of the incoming call on a second screen that is located on the second surface; and
   in response to determining that the answer option presents the answering operation on the second screen, outputting a sound of the incoming call from the second sound opening located on the second surface.

2. The method of claim 1, further comprising:
   determining whether to display the incoming call operation option on the first screen or the second screen according to a pre-determined incoming call display rule comprising at least one of the following:
      displaying the incoming call operation option on the first screen;
      displaying the incoming call operation option on a currently-awakened screen of the first screen and the second screen;
      displaying the incoming call operation option on a screen currently facing up of the first screen and the second screen;
      displaying the incoming call operation option on a last-awakened screen of the first screen and the second screen; and
      displaying the incoming call operation option on both of the first screen and the second screen.

3. The method of claim 1, wherein outputting the sound of the incoming call from the second sound opening comprises:
   awakening the second screen; and
   outputting the sound of the incoming call from the second sound opening on the second surface where the second screen is also located.

4. The method of claim 3, wherein awakening the second screen comprises:
   displaying associated information of the incoming call and a set of available call functions on the awakened second screen.

5. The method of claim 1, wherein outputting the sound of the incoming call from the second sound opening on the second surface where the second screen is located comprises:
   activating one of the first headphone or the second headphone in communication with the second sound opening.

6. The method of claim 5, further comprising:
   determining one or more audio parameters corresponding to a headphone identifier of an activated headphone for the second screen, according to a correspondence between the headphone identifier and the one or more audio parameters; and
   adjusting the activated headphone for the second screen according to the determined one or more audio parameters.

7. A method of answering an incoming call on a dual-screen mobile device, the method comprising:
   upon receiving an incoming call, displaying an incoming call operation option on a first screen of two screens included on the dual-screen mobile device, wherein the first screen is located on a first surface of a main body that is opposite a second surface, wherein the main body comprises:
  a headphone having a first sound exit surface and a second sound exit surface opposite to the first sound exit surface;
  a first electromagnetic valve on a passage from the first sound exit surface of the headphone to one of a first sound opening on the first surface where the first screen is located or the second sound opening; and
  a second electromagnetic valve on a passage from the second sound exit surface of the headphone to the other one of the first sound opening or the second sound opening;
determining an answer operation performed by a user in response to the incoming call operation option;
determining an answer option based on the answer operation, wherein the answer option includes implementing an answering operation of the incoming call on a second screen that is located on the second surface; and
in response to determining that the answer option presents the answering operation on the second screen, outputting a sound of the incoming call from a second sound opening located on the second surface.

8. The method of claim 7, wherein outputting the sound of the incoming call from the second sound opening comprises:
  opening the second electromagnetic valve between the headphone and the second sound opening on the second surface where the second screen is located;
  closing the first electromagnetic valve between the headphone and the first sound opening on the first surface where the first screen is located; and
  activating the headphone.

9. A dual-screen mobile device, comprising:
  two screens comprising a first screen and a second screen;
  a main body comprising a first surface and a second surface opposite to the first surface, wherein the second screen and the first screen are located on opposite surfaces of the main body;
  a first sound opening located on the first surface;
  a second sound opening located on the second surface;
  the main body further comprising:
    a first headphone having a first sound exit surface in communication with one of the first sound opening or the second sound opening; and
    a second headphone having a second sound exit surface in communication with the other one of the first sound opening or the second sound opening not in communication with the first headphone;
  a processor; and
  a memory configured to store processor-executable instructions that, when executed by the processor, cause the processor to:
    upon receiving an incoming call, display an incoming call operation option on the first screen of the dual-screen mobile device;
    determine an answer operation performed by a user in response to the incoming call operation option;
    determine an answer option based on the answer operation, wherein the answer option includes implementing an answering operation of the incoming call on the second screen; and
    in response to determining that the answer option presents the answering operation on the second screen, output a sound of the incoming call from the second sound opening located on the second surface.

10. The dual-screen mobile device of claim 9, wherein the processor-executable instructions, when executed by the processor, further cause the processor to:
  determine whether to display the incoming call operation option on the first screen or the second screen according to a pre-determined incoming call display rule comprising at least one of the following:
    displaying the incoming call operation option on the first screen;
    displaying the incoming call operation option on a currently-awakened screen of the first screen and the second screen;
    displaying the incoming call operation option on a screen currently facing up of the first screen and the second screen;
    displaying the incoming call operation option on a last-awakened screen of the first screen and the second screen; and
    displaying the incoming call operation option on both of the first screen and the second screen.

11. The dual-screen mobile device of claim 9, wherein the processor-executable instructions, when executed by the processor, causes the processor to output the sound of the incoming call from the second sound opening by:
  awakening the second screen; and
  outputting the sound of the incoming call from the second sound opening.

12. The dual-screen mobile device of claim 11, wherein the processor-executable instructions, when executed by the processor, further causes the processor to:
  display associated information of the incoming call and a set of available call functions on the awakened second screen.

13. The dual-screen mobile device of claim 9, wherein the processor-executable instructions, when executed by the processor, further causes the processor to:
  activate one of the first headphone or the second headphone in communication with the second sound opening.

14. The dual-screen mobile device of claim 13, wherein the processor-executable instructions, when executed by the processor, further causes the processor to:
  determine one or more audio parameters corresponding to a headphone identifier of an activated headphone for the second screen, according to a correspondence between the headphone identifier and the one or more audio parameters; and
  adjust the activated headphone for the second screen according to the determined one or more audio parameters.

* * * * *